(12) United States Patent  
Imbimbo et al.

(10) Patent No.: US 8,700,746 B2  
(45) Date of Patent: Apr. 15, 2014

(54) PROVISION OF TELEMATICS SERVICES VIA A MOBILE NETWORK

(75) Inventors: Amedeo Imbimbo, Caivano (IT); Enrico De Luca, Caserta (IT); Guido Gehlen, Neuss (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 273 days.

(21) Appl. No.: 12/808,814

(22) PCT Filed: Dec. 20, 2007

(86) PCT No.: PCT/EP2007/011290  
§ 371 (c)(1),  
(2), (4) Date: Oct. 18, 2010

(87) PCT Pub. No.: WO2009/080076  
PCT Pub. Date: Jul. 2, 2009

(65) Prior Publication Data  
US 2011/0035476 A1    Feb. 10, 2011

(51) Int. Cl.  
*G06F 15/177* (2006.01)

(52) U.S. Cl.  
USPC ......................................................... 709/220

(58) Field of Classification Search  
USPC ......................................................... 709/220  
See application file for complete search history.

(56) References Cited

U.S. PATENT DOCUMENTS

| | | | | |
|---|---|---|---|---|
| 4,750,197 A | * | 6/1988 | Denekamp et al. | 455/404.2 |
| 5,999,808 A | * | 12/1999 | LaDue | 455/412.2 |
| 6,101,178 A | * | 8/2000 | Beal | 370/336 |
| 6,195,458 B1 | * | 2/2001 | Warnick et al. | 382/173 |
| 6,294,997 B1 | * | 9/2001 | Paratore et al. | 340/572.1 |
| 6,745,027 B2 | * | 6/2004 | Twitchell, Jr. | 455/422.1 |
| 6,953,919 B2 | * | 10/2005 | Clothier | 219/620 |
| 7,336,243 B2 | * | 2/2008 | Jo et al. | 343/895 |
| 2002/0098853 A1 | | 7/2002 | Chrumka | |
| 2003/0210806 A1 | | 11/2003 | Yoichi et al. | |
| 2004/0142678 A1 | * | 7/2004 | Krasner | 455/404.2 |
| 2005/0140502 A1 | * | 6/2005 | Ashizawa | 340/10.52 |
| 2006/0166644 A1 | | 7/2006 | Champion | |

FOREIGN PATENT DOCUMENTS

| | | |
|---|---|---|
| CN | 1762173 A | 4/2006 |
| JP | 2003240588 A | 8/2003 |
| JP | 2004029001 A | 1/2004 |
| JP | 2006277572 A | 10/2006 |
| JP | 2007521712 A | 8/2007 |
| WO | 01/69570 A2 | 9/2001 |

* cited by examiner

*Primary Examiner* — Alicia Baturay  
(74) *Attorney, Agent, or Firm* — Coats & Bennett, P.L.L.C.

(57) ABSTRACT

The invention relates to the use of mobile networks (110) in a telematics environment. A method embodiment of the invention performed by an application server (108) accessible via the mobile network (110) comprises the steps of receiving setting information (124) via a radio interface (126) of the mobile network, wherein the setting information indicates an environment setting of an environment in which a user terminal (106) is deployed; and controlling an application (109) hosted by the application server according to the received setting information.

26 Claims, 7 Drawing Sheets

PROVISION OF TELEMATICS SERVICES VIA A MOBILE NETWORK

TECHNICAL FIELD

The invention relates to techniques for controlling an application server accessible via a mobile network. More specifically, the invention relates to techniques for controlling a telematics service hosted by an application server accessible via a mobile network.

BACKGROUND

From a general point of view, telematics services comprise such diverse applications as traffic-related services, facility management services, remote control of appliances, health-related telematics services ("E-health"), telematics services in the field of security appliances, etc. Probably most popular is the field of traffic-related telematics service which, when related to telematics services in and for vehicles, is sometimes called vehicle telematics, and the services provided in this field are called vehicle telematics. While the terms "traffic-related telematics" and "vehicle telematics" will be used mostly as synonyms herein and automotive services from this field will be considered for exemplification, one has to keep in mind that the following description is also applicable for telematics services in many other fields.

Examples for vehicles are road vehicles like cars, trucks, busses, water vehicles like ships and boats, flight vehicles like planes, aircrafts, and helicopters, and rail vehicles like trains.

Many traffic-related telematics services eventually intend to coordinate road traffic, i.e. to increase an efficiency of use of a traffic infrastructure, for example by avoiding traffic jam, traffic arising from searching a parking place or by minimizing empty runs of freight vehicles. Typical road vehicle telematics services—also referred to as automotive applications—in this regard are traffic forecast services and traffic alert services. Service information provided by such services may be directly output to the road vehicle driver or may possibly be fetched to electronic car navigators. Other road vehicle services may, for example, relate to assistance in case of road vehicle malfunctions or accidents. Many of these road vehicle telematics services are based on the geographical position or location of the user(s), respectively their user terminal(s). The required position information (location information) may, for example, be determined by GPS (Global Positioning System) units mounted on-board of the vehicles or derived from the user terminal(s). Similar applications are conceivable for other types of vehicles like water, flight, or rail vehicles.

Telematics services may be provided by application servers, to which information from the vehicles has to be transmitted and from which service information is transmitted back to the vehicles. For example, a traffic forecast service will rely on geographical location information of a fair subset of the vehicles constituting a particular traffic flow in order to be able to determine not only a momentary status of the flow, but also to arrive at a realistic assumption on the future development of the traffic flow. An application server hosting an application for a traffic forecast service thus receives location information on a first communication path and provides the traffic forecast information on a second communication path (where both pathways will in general not be identical).

The use of mobile networks in a telematics environment to provide one or both of the communication pathways between vehicles and application server provides advantages over the use of other, probably specifically designed networks. Mobile networks are available and mobile phones (mobile terminals, user terminals) are in wide-spread use in many of the areas where telematics services may be offered, for example in Europe and many regions of Asia. The location of mobile phones can be tracked not only because some of them have a built-in GPS unit; the mobile network itself may determine a location of the mobile device by one of various cellular localization procedures; e.g., the location of the mobile device may be determined via triangulation from nearby base stations. Such techniques are available for the provisioning of location based services in many mobile networks. Therefore it is not necessary that complex and expensive GPS units are available in many mobile phones and/or vehicles; instead, the mobile network may determine location information from a sufficiently large number of service participants in order to provide, e.g., a traffic forecast service.

While the accuracy of conventional GPS is low, Differential GPS (D-GPS) may achieve an accuracy in the metre-range; however, D-GPS is also more complex and may not be available at any time and any place. Cellular localization mechanisms have an accuracy in the range of 200 metres-2 kilometres, which may be improved by comparing the measured location of the phone with a stored road map.

Generally, when using location information indicative of a location of the mobile phone, it is implicitly assumed that the location of the mobile phone is identical to the location of the vehicle. However, while a vehicle's on-board GPS unit may be fixedly associated with the vehicle, a mobile phone is not; a mobile phone is in general (loosely) associated with its user and is thus mobile.

A vehicle telematics service based on conventional cellular localization may not be very reliable and precise, as it can not be determined whether any particular mobile terminal is actually located inside a vehicle being part of the traffic flow to be analysed, or does in fact belong to a parking vehicle, a pedestrian or even a user in a nearby building. In case these mobile phones (user terminals) are registered for the service, their location information will be considered by the server although this will distort the traffic flow calculation.

In order to offer a more reliable and precise service, complex mechanisms such as D-GPS and/or mapping of measured locations to road maps are required. Even then, the service is based on, e.g., the availability of D-GPS and its accuracy depends strongly on plausibility considerations that localized mobile phones on a road according to a road map are actually participating in the traffic flow that is to be analyzed. In any case, those types of improved mechanisms involve complex determination routines and may also lead to wrong results in case the underlying assumption that the mobile phone is actually participating in the traffic flow is wrong.

SUMMARY

There is a demand for a technique for providing reliable server-based telematics services, such as vehicle telematics services, which are less complex than the above-described mechanisms.

This demand is satisfied by a first method of controlling an application server. The method is performed by an application server accessible via a mobile network and comprises receiving setting information via a radio interface of the mobile network, wherein the setting information indicates an environment setting of an environment in which a user terminal is deployed; and controlling an application hosted by the application server according to the received setting information.

The mobile network may, for example, be a GSM (Global System for Mobile Communication), UMTS (Universal Mobile Telecommunications System) or LTE (UMTS Long Term Evolution) network. The application server may be related in various ways to the mobile network; for example, the server may be part of the mobile network, e.g. may belong to an IMS (Internet Multimedia Subsystem) of an UMTS network. In other variants, the application server is located external from the mobile network and may be accessed via, e.g., one or more fixed networks such as the Internet. The user terminal may be any terminal device capable of communicating via the radio interface of the mobile network, which comprises, for example, mobile phones, smartphones, PDAs (Personal Digital Assistants), notebooks, etc. The user terminal may be related to a single user or a group of users and may also relate to one or both of a physical user or a non-personal user such as a company.

Setting information can be understood as information about a deployment of a user terminal in an environment. It can be thus indicative of a relation between a user terminal and an environment in which the user terminal is deployed. Such a relation can be defined by an environment setting.

An environment setting may be expressed by a framework comprising one or more particular surrounding or surrounding conditions of the environment in which the user terminal is deployed. As an example, two environment settings may be predefined, namely "in a vehicle" and "not in a vehicle", meaning "the user terminal is in an environment called vehicle" or "the user terminal is not in an environment called vehicle". The setting information may indicate exactly one of these predefined possibilities. In this example, the setting information may be received as a 1-bit information, namely "bit set" and "bit unset", which may indicate the above environment settings according to a predefined prescription, e.g. "in a vehicle" may be indicated by setting information "bit=1" and "not in a vehicle" by setting information "bit=0". Thus, in case a plurality of environment settings are predefined, the setting information may indicate one of these settings by (short) reference only.

According to one implementation, the environment may be a physical object and the setting information is indicative of a relation between the user terminal and the physical object. For example, the setting information may comprise an indication of a position of the user terminal in relation to a physical object. For instance, a type or kind of physical object may be referred to. For example, the physical object may be a vehicle (such as a car, bus, van, but also a ship, plane, etc.), a building, e.g., a public building such as a library in contrast to other public or private buildings, a room in a building, such as a meeting room, for example. The physical object may also be understood as being a general site such as "near to a stopping point for public transport", e.g., railway or bus stations, or "the central place in a city". The setting information may indicate that a position of the user terminal is "in", "inside", "near to", "in close vicinity to", etc. related to the physical object. As a more general example, the existence of a positional relation of a user terminal and a physical object may be determined based upon, for example, the establishment of a local communication connection, especially via a short range communication technique like e.g. Bluetooth or other techniques that have a coverage of several meters or less, between local communication units in the user terminal and the physical object, e.g., Bluetooth communication units in the user terminal and a vehicle. The setting indication may in this case indicate "local communication established", which may not necessarily mean that the user terminal is "in" the physical object, but may define the meaning of "near to" or "in close vicinity to".

In any case, the application server is enabled to distinguish those terminal devices from which appropriate setting information is received from others that do not submit this kind of setting information.

As exemplarily described already, in some realizations the setting information may indicate whether or not the user terminal is near to or inside the physical object. Taking the above examples further, the setting indication may indicate either "in a vehicle" or "not in a vehicle" (occasionally given for brevity as "not/in a vehicle" herein), "not/in a meeting", "not/at home", "at the central place in the city" or "near to a stopping point for public transport". Other spatial relations may also be indicated as required by a particular application.

The setting information may comprise an indication of an operational status of the physical object. For example, the status indication may indicate whether a motor of the object is started and/or whether the object moves. Additionally or alternatively, a velocity of the physical object may be indicated. Such information may be useful with respect to any type of motorized and/or movable physical object type, for example for the environment settings "not/in a vehicle", but also for settings related to busses, vans, trains, ships, etc and may further help to discriminate parking (non-operational) vehicles from driving (operating) vehicles on a traffic path (e.g. road, river etc), hence increasing the precision of the application.

Some implementations of the method may comprise the step of initiating, triggered by the reception of the setting information, an execution of a localization service to determine a location related to the user terminal and/or a terminal device associated with the environment, in which the user terminal is deployed. For example, a traffic forecast service application may be configured to include a position of a user terminal into traffic forecasts only after the terminal has indicated its environment setting as being "in a vehicle". After this kind of setting indication has been received, a localization service (localization application) may be started in order to determine the position of the user terminal. For example, location information may be requested by a localization service in the mobile network from the user terminal or from a terminal device associated with a physical object such as a vehicle, within which the user terminal is located. A GPS unit provided in the user terminal or built into the physical object, e.g., the vehicle, may be used to determine the requested location information.

The application executed on the server may implement a vehicle telematics service such as a traffic forecast or traffic alert service, or may implement any other vehicle telematics service related to vehicle tracking, trailer tracking, fleet management, emergency warning systems for vehicles, etc. Instead of relating to road traffic, the application may also relate to rail traffic or any other kind of traffic. Still further, the application may be a telematics application in a wider sense, e.g. related to telecontrolling of appliances such as household appliances, control of traffic lights, or of configurations related to a user of the user terminal; e.g. a user profile of the user in the mobile network and/or any other network may be configured according to the received setting indication.

The setting information may be comprised in a user profile related to the user terminal. For example, the step of controlling the application may comprise the steps of representing the setting information in the user profile related to the user terminal, and accessing the setting information represented in the user profile by the application. The user profile may be hosted in the mobile network, e.g. in a HLR (Home Location Register) or HSS (Home Subscriber Server), a user profile storage in other networks, or may be hosted by or associated with the application server itself. The user profile may accessed, e.g., repeatedly (due to a polling operation of an application server) or independently from the time when the setting information has been established, by any other application as well and also by control entities in the mobile network. Further, in this way, the setting information may be used to control a user profile of a user of the user terminal in the mobile network and/or any other communication environment, e.g., telematics environment according to an environment or surrounding, within which or near to which the user terminal and the user thereof are located.

The step of controlling the application may comprise starting the application. For example, a localization application may be started in order to determine a location of the user terminal and provide corresponding location information to other applications such as a traffic forecast application. Alternatively or additionally, the step of controlling the application may comprise (re-)configuring the application. For example, a traffic forecast application may be configured to include a location of the user terminal only in response to receiving an appropriate setting information.

In some realizations of the method, the step of controlling the application may comprise the step of providing result information resulting from the execution of the application to at least one of the user terminal and the physical object. For example, a traffic forecast service may provide a traffic forecast information via the mobile network and via a point-to-point connection or a point-to-multipoint connection (broadcast, multicast) to the user terminal.

The above-mentioned demand is further satisfied by a second method of controlling an application server accessible via a mobile network. This method is performed by a terminal device of the mobile network and comprises the steps of establishing setting information indicating an environment setting of an environment in which a user terminal is deployed; and transmitting the setting information via a radio interface of the mobile network to the application server for controlling an application according to the setting information. The terminal device may comprise the user terminal or a terminal device associated with the environment setting in which the user terminal is deployed; for example the terminal device may be fixedly built into a vehicle.

Mandatory and optional properties of the setting information as well as the application have been summarized already above with respect to the first method; the aspects discussed therein are applicable also for the setting information and the application as recited in the second method.

Referring further to the second method, the step of transmitting the setting information may be automatically triggered by the step of establishing the setting information. For example, the user terminal may be physically connected to a vehicle, and may perform an environment setting determination routine operating on information received from the vehicle in order to determine whether it is located "not/in a vehicle". In case the routine comes to a conclusion that the environment setting is or has changed to "in a vehicle", the routine may trigger the transmission of setting information indicating "in a vehicle".

The step of establishing the setting information may comprise the steps of receiving an indication for the environment setting via a local communication connection between the user terminal and the terminal device associated with the environment in which the user terminal is deployed; and determining the setting information from the indication. For example, the indication may comprise the establishment of a particular communication regime, which is typically used in a particular environment. For instance, the user terminal may establish a Bluetooth communication with a hands-free kit of a vehicle. The Bluetooth HFP (Hands-Free Profile) may be established between them. The user terminal may conclude based on the connection establishment that it is located in a vehicle. For example, a Bluetooth pairing mechanism may be performed between the local communication units in the user terminal and the vehicle. A device address of the Bluetooth communication unit of the user terminal may be stored in the Bluetooth communication unit of the vehicle (and/or vice versa). The user may also authorize him- or herself in other ways before the vehicle. For instance, an actuation of the starter lock may be used as an indication that the user is "in the vehicle" with information about the actuation being indicative for an environment setting represented by the setting information "in the vehicle".

As another variant, if the Bluetooth communication rests longer than a time period such as, e.g., 10 seconds, the user terminal may conclude that it is indeed in the vehicle and not only passing by, and may then transmit a respective setting information to the mobile network.

In another embodiment, a terminal device fixedly associated with a vehicle may use the establishment of a short-range communication connection with the user terminal as indication and may accordingly determine the setting information "in a vehicle" as related to the user terminal connected with the terminal device from this indication.

The local indication may be received during establishment of the local communication connection to, e.g., an environment setting-specific device, i.e. a terminal device which is fixedly associated with the environment, for example during establishment of an USB or Bluetooth communication. The setting-specific device may be a local communication unit physically associated with a physical object, for example, may be a hands-free kit built into a vehicle. Another example may concern a Bluetooth base station or WLAN access point located in a meeting room, at home, at a public transport stopping point, etc.

As exemplarily described already, the local communication connection may comprise a wireless local communication connection according to Bluetooth, WLAN or similar short-range communication standards. Wireless communication connections due to their contact-free properties may advantageously be established automatically, i.e. do not require any actions to be performed by the user.

The second method may comprise the further steps of receiving a request for location information from the application server and providing the requested location information. For example, a localization application may request GPS information from the user terminal in response to the setting information provided by the terminal.

Further, the abovementioned demand is satisfied by a computer program product, which comprises program code portions for performing the steps of any one of the methods and method aspects described herein when the computer program product is executed on one or more computing devices, for example an application server or a user terminal. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

The abovementioned demand is further satisfied by an application server accessible via a mobile network. The application server comprises a first component adapted to receive setting information via a radio interface of the mobile network, wherein the setting information indicates an environment setting of an environment in which a user terminal is deployed; and a second component adapted to control an application hosted by the application server according to the setting information.

Properties of the setting information and the application have been summarized above. This discussion is applicable also for the setting information as received and used by the application server and the application hosted therein.

The application server may further comprise a component adapted to execute, triggered by the reception of the setting information, a localization application to determine a location of the terminal device. The localization application may be hosted by the mobile network, or may be hosted by the application server. In any case, the localization application may be configured to request the location information from the terminal device.

The second component may be adapted to represent the setting information in a user profile related to the user terminal, and may further be adapted to access the setting information comprised in the user profile.

Still further, the abovementioned demand is satisfied by a terminal device of a mobile network. The terminal comprises a first component adapted to establish setting information indicating an environment setting of an environment in which a user terminal is deployed; and a second component adapted to transmit the setting information via a radio interface of the mobile network to an application server for controlling an application according to the setting information. The terminal device may comprise the user terminal or a terminal device associated with the environment in which the user terminal is deployed.

The first component may be adapted to automatically trigger the second component upon establishing the setting information.

The first component may be adapted to receive a local indication of the environment setting via a local communication connection; and may be adapted to determine the setting information from the local indication. The first component may further be adapted to receive the local indication during establishment of the local communication connection to an environment setting-specific device. The first component may additionally or alternatively be adapted to the local communication connection comprising a wireless local communication connection.

The abovementioned demand is further satisfied by a user profile related to a user terminal. The user profile may be implemented in a user terminal connectable to a mobile network, in a user profile storage of the mobile network, or in or associated with an application server accessible via the mobile network. The user profile comprises a data field for representing a setting information indicating an environment setting in which the user terminal is deployed. The setting information may have the properties as summarized above.

The abovementioned demand is moreover satisfied by a communication system comprising an application server and a user terminal as summarized above.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as specific environment settings and network systems including particular network nodes, communication standards etc., in order to provide a thorough understanding of the current invention. It will be apparent to one skilled in the art that the current invention may be practiced in other embodiments that depart from these specific details. While the description concentrates on vehicle telematics services, the invention may also be practiced in other fields, such as remote control of appliances in private and/or public environments, emergency services, other telematics services, etc. The skilled artisan will further appreciate that the current invention may be practised with communication networks different from the UMTS network as discussed below to illustrate the present invention. This may include other mobile networks, such as GSM networks. The invention may also be practiced with wireline communication systems. For example, an application server may be provided in an in-house IP-network (e.g., a company's intranet). Basically, the invention may be practiced with any communication system providing server-based services such as—in a widest sense—telematics services.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor. Any of the nodes or functional entities described herein, such as application server and user terminal, may be implemented as computing devices comprising a computer processor and a memory coupled to the processor.

Figure 1:
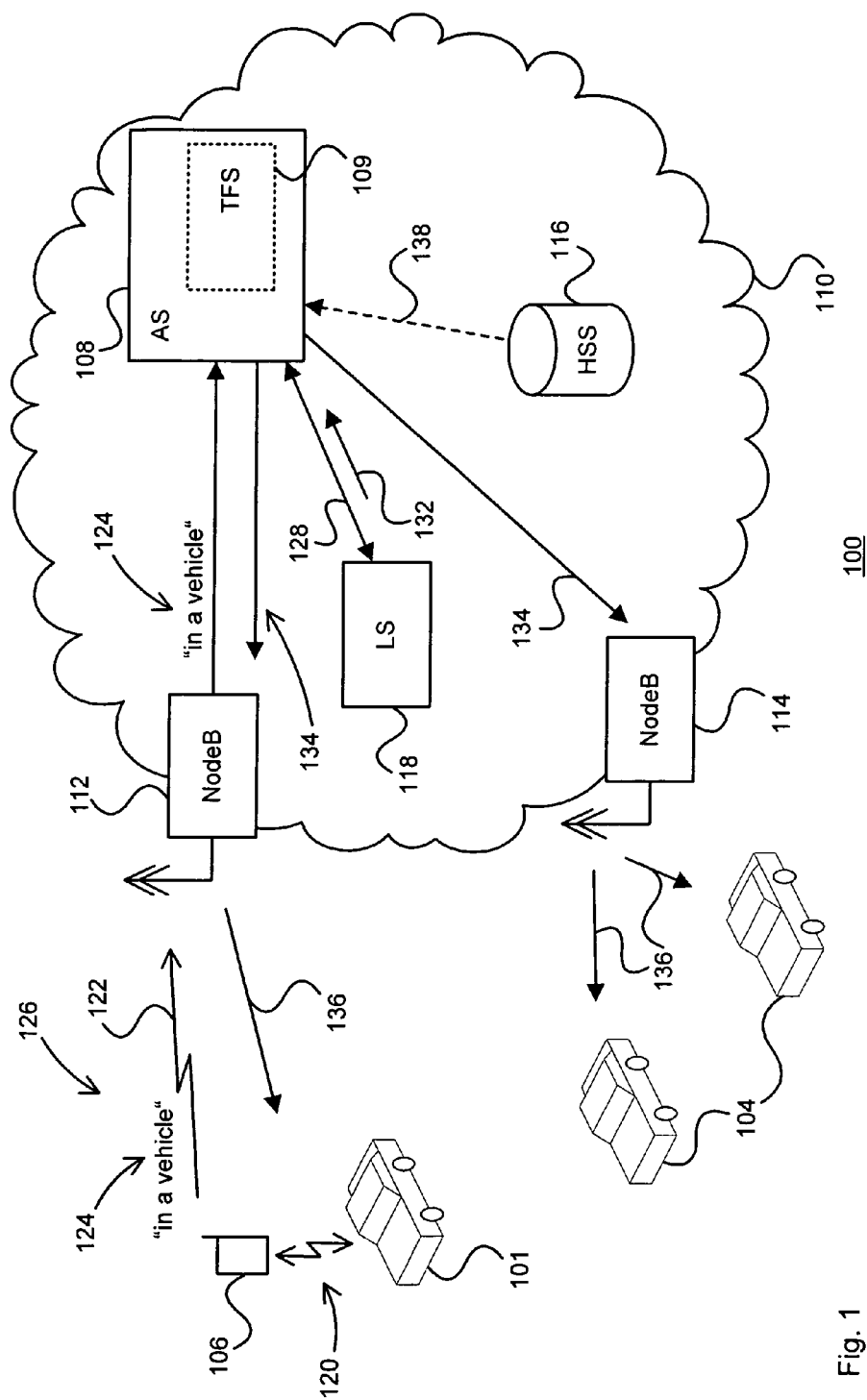
FIG. 1 is a schematic overview of an embodiment of a communication system for providing a telematics service to a user terminal.

FIG. 1 schematically illustrates a communication system 100 for providing a traffic-related service to users of vehicles 101 and 104. The communication system 100 comprises a user terminal 106 and an application server (AS) 108 in an UMTS network 110, wherein the UMTS network 110 is an exemplary realization of a mobile network. The user terminal 106 is a mobile terminal enabled for communication with UMTS network 110. From the components of the network 110, only two NodeBs (radio base stations) 112 and 114 as well as an HSS (Home Subscriber Server) 115 are explicitly illustrated. A localization server 118 provides localization services for network-based determination of location information for mobile devices to services in or associated with the UMTS network 110, i.e. for presence services of the network and/or external application providers. The localization server 118 may, e.g., host a Mobile Positioning Service (MPS). The application server 108 hosts a Traffic Forecast Service (TFS) application 109.

Next, with reference to FIG. 1 a brief outline of an operation of communication system 100 related to a provisioning of the TFS implemented by application 109 will be given. A more detailed description will be given thereafter. A local communication connection 120 will be established between user terminal 106 and a local communication unit fixedly associated with vehicle 101. It will be assumed in the following that the communication 120 is a Bluetooth communication; however, any other realization of a local communication connection based on WLAN, FireWire, etc. could also be used. The terminal 106 determines by means of the communication connection 120 that it is located inside vehicle 101 (the terminal 106 is drawn outside vehicle 101 in FIG. 1 for the sake of illustration). Based on this determination, the user terminal 106 transmits in a transmission 122 setting information indicating "in a vehicle" (e.g. "in a car") 124 via radio interface 126 to the UMTS network 110. As discussed hereinbefore, the indication may be an ASCII string "in a vehicle", e.g. in an XML message, but may also only comprise a single bit (set or unset) in a data field provided for the setting information according to the communication mechanism underlying the transmission 122. For example, the transmission 122 may comprise an SMS sent towards the application server 108.

The NodeB 112 forwards the received setting information 124 to application server 108. The application server 108 may, for example, be located in an IMS (Internet Multimedia Subsystem) domain of the UMTS network 110. While server 108 is shown as being a part of network 110 in FIG. 1, in other embodiments, an application server may be located outside the mobile network and may be connected thereto via, e.g., fixed communication lines, in order to receive setting information such as information 124. The application server 108 determines from the setting information 124 that device 106 from now on has to be considered by the TFS application 109. Therefore, application server 108 initiates a communication 128 with localization server 118.

The localization server 118 uses a network-based triangulation mechanism in order to determine a location of user terminal 106 with an accuracy of several meters in a metropolitan area or with an accuracy of only some dozens or even hundreds of meters in case of a rural area. The localization server 118 may, e.g., make use of NodeBs 112 and 114 for this purpose (not explicitly illustrated in FIG. 1). In other embodiments, the AS 108 or mobile network 110 may request location information from user terminal 106, which may deliver location information based on a GPS unit in the terminal 106 or vehicle 101. Referring to FIG. 1, the localization server 118 provides via communication connection 128 location information 132 for to the terminal 106 to the application server 108.

The application 109 uses the location information 132 for determining a traffic forecast by assuming that the location of the terminal 106 as given by information 132 is indicative for the position of vehicle 101. This assumption is based on the prior reception of the setting information 124 and thus results in a more reliable traffic forecast as compared to a service considering the locations of any registered terminals without having information about the actual environment setting of the terminals. The traffic forecast is provided 134 by the AS 108 to a distribution area supported by the mobile network 110, which may comprise the NodeBs 112 and 114. The NodeBs then transmit the traffic forecast to vehicles 101 and 104, for example via a broadcast or multicast transmission 136.

While it has been shown in FIG. 1 that the setting information 124 is forwarded by NodeB 112 directly to the application server 108, in other embodiments the setting information may be provided to the HSS 115 instead. For example, user profiles managed in the HSS may comprise one or more data fields for representing the setting information. From the HSS, the setting information may be automatically provided to the application server, e.g. in case the setting information or a portion thereof has changed; or the setting information is provided on request to the application server (the provision of setting information from the HSS to the application server is indicated by dashed arrow 138 in FIG. 1).

Figure 2A:
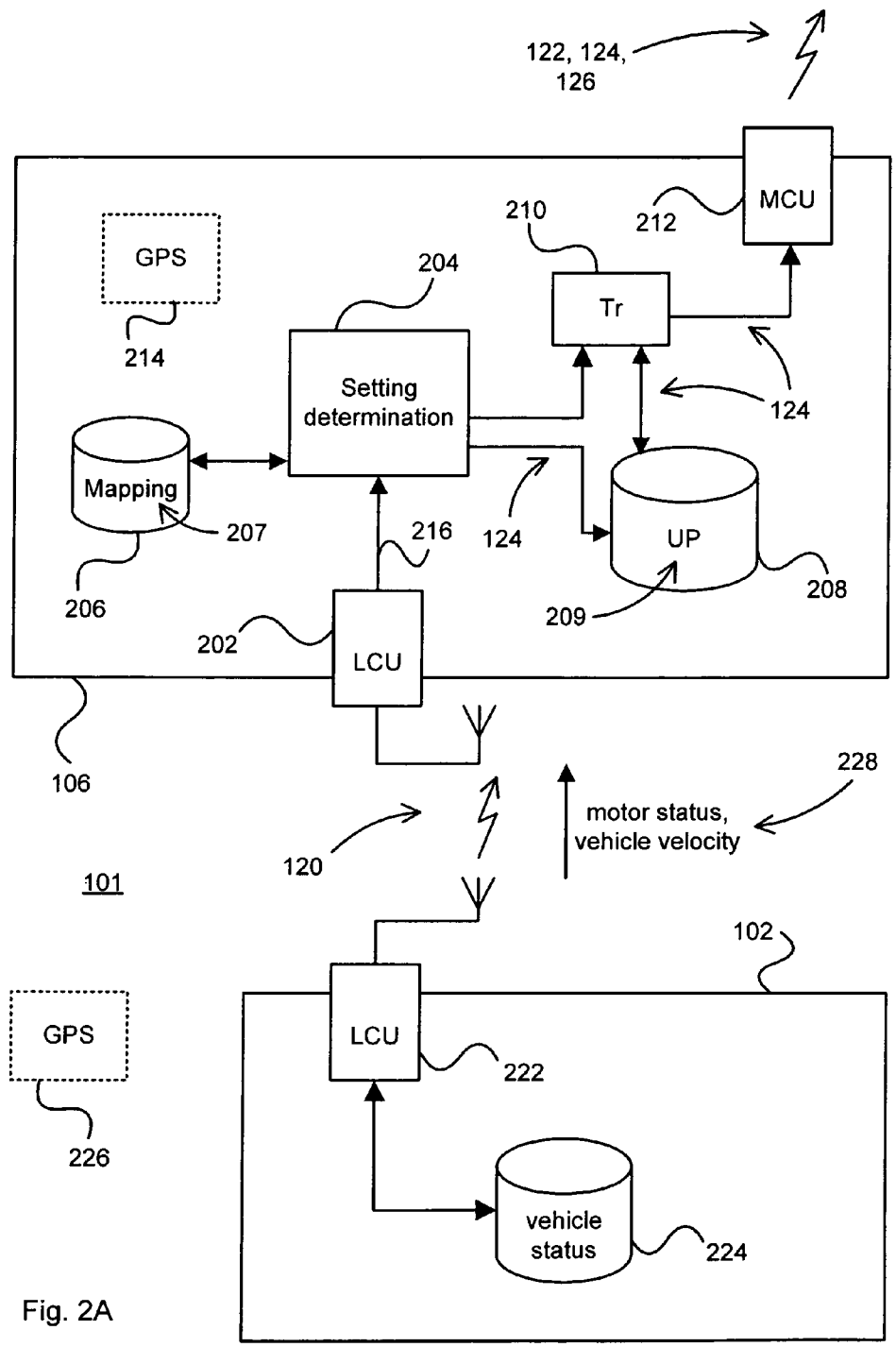
FIG. 2A schematically illustrates functional components of a first embodiment of the user terminal and vehicle of FIG. 1.

FIG. 2A illustrates in some more detail functional components of a first embodiment of the user terminal 106 and a terminal device 102 in vehicle 101. The user terminal 106 may be situated inside a passenger room of vehicle 101 while terminal device 102 is assumed to be fixedly built-in into the vehicle 101. The illustrated components contribute to the operation of the system 100 in FIG. 1. The mobile terminal 106 comprises a short range or local communication unit (LCU) 202, a setting determination component 204, a mapping storage 206, a profile storage 208, a transmission component 210 and a mobile communication unit (MCU) 212. The terminal device 102 comprises an LCU 222 and a status storage 224. The terminal device 102 may, e.g., comprise a Bluetooth communication unit, as further described below. One or both of the user terminal 106 and the vehicle 101 may further comprise a GPS unit 214 and 226, respectively.

Figure 3:
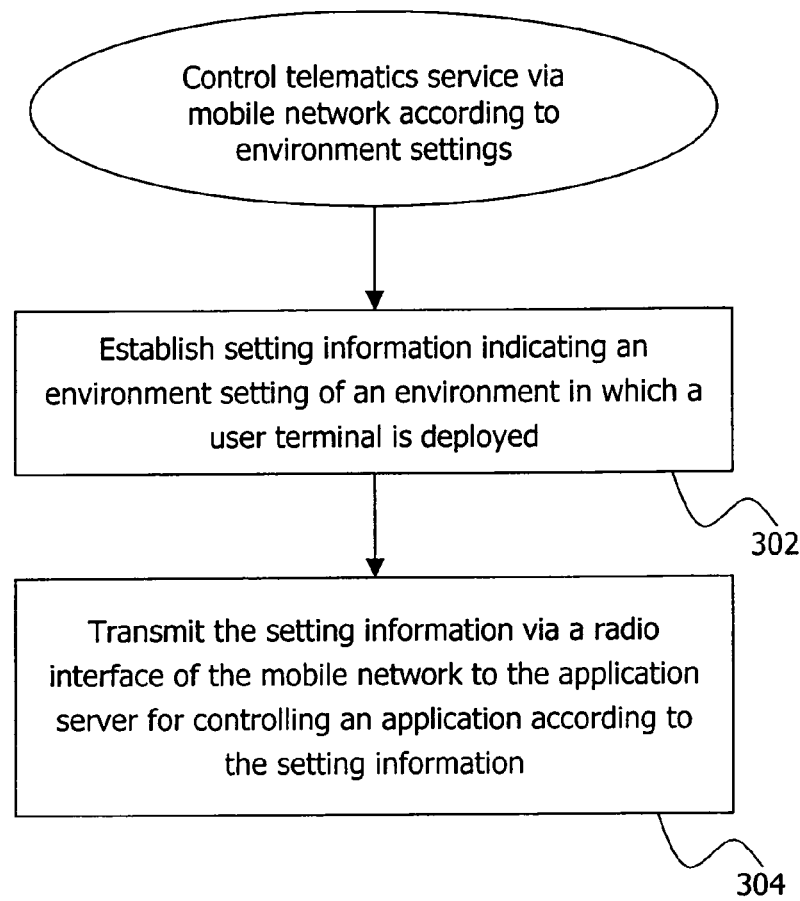
FIG. 3 is a flow diagram exemplarily illustrating an operation of the terminal device of FIG. 2A or 2B.

FIG. 3 is a flow diagram illustrating an exemplary operation 300 of mobile terminal 106 and terminal device 102 in vehicle 101 and an interworking of the components thereof. Generally speaking, the mobile terminal 106 operates to control the traffic forecast service application 109 (cf. FIG. 1) via mobile network 110 according to environment settings which may be related to the characteristics of the environment of the terminal 106.

Referring to FIGS. 2A and 3, in step 302 the terminal 106 establishes the setting information 124 indicating an environment setting of an environment in which the user terminal 106 is deployed. In the example illustrated in the figures, the setting information 124 indicates that terminal 106 is located "in a vehicle", namely in vehicle 101. The setting information 124 does not indicate any specific vehicle, such as specifically the vehicle 101, or a geographical position, but indicates the general environment or type of environment setting, within which or at which the terminal 106 is located.

In order to establish the setting information 124, the following steps may be performed: When a user of the user terminal 106 enters the vehicle 101, the LCUs 202 and 222 may either automatically or upon a command manually entered on terminal 106 establish the communication 120. Both LCUs 202 and 222 may be, e.g., Bluetooth communication units adapted for communicating according to the Bluetooth standard and using a Hands-Free Profile (HFP) of the Bluetooth standard for hands-free kits in vehicles (a hands-free kit is not illustrated in the figures for the sake of clarity.) During communication establishment, both LCU components 202 and 222 agree upon communicating within each other according to the HFP. The device address of the LCU 222 can be used as an indication of its local environment setting by the mobile terminal 106. As indicated by arrow 216 in FIG. 2A, the LCU 202 is configured to provide a trigger signal to the setting determination component 204, the trigger signal indicating the device address of LCU 222. Of course, the LCU 202 may handle further data, such as data 228 described below, for transceiving these via the communication link 120.

The setting determination component 204 operates to access the mapping storage 206 upon receiving the trigger signal 216 from the LCU 202. The storage 206 comprises a mapping table 207 including an association of indications such as indication 216 which may be provided by the LCU 202 with predefined environment settings. For example, device addresses according to various local (short-range) communication standards may be associated with the settings. The mapping table need not explicitly include such setting information. For example, in case only the two environment settings "not/in a vehicle" are possible, a single bit which is either set or unset will be sufficient to carry the setting information. More sophisticated sets of predefined environment settings require longer bit mappings, or the determined environment setting may indeed be represented in text form, such as in human-readable ASCII format.

The component 204 extracts the appropriate setting information from the mapping stored in component 206 and provides this setting information 124 to an active user profile 209 stored in component 208. The component 208 may be a storage component of the terminal 106 or may, e.g., be located on a SIM or USIM (UMTS Subscriber Identity Module) card inserted into terminal 106. While the user profile 209 may comprise various data fields related to a user of the terminal 106, the terminal itself, and the mobile network 110, it may in particular comprise a data field for representing the setting information "not/in a vehicle". As mentioned already, the data field may have a length of a single bit only, or may be configured to represent in text form setting information such as "not in a vehicle".

Instead of using only the mere communication establishment itself for deriving a setting information, in a more sophisticated example the LCU 222 in terminal device 102 associated with the vehicle 101 may access, during establishment of communication 120, the storage component 224 in order to read out operational status information 228 of vehicle 101. The storage component 224 may be adapted to store such operational status information, which may, for example, be determined from sensors in the vehicle and processor logic connected thereto. The operational status information may represent information on, e.g., whether the motor is on, whether the vehicle is moving and, if the vehicle is moving, its current velocity. The storage component 224 may for example be a cache or similar storage component associated with a central processor in an on-board network of vehicle 101, wherein the cache stores current operational status conditions for various purposes, for example for access by electronic driver assistance systems such as Antilock Brake System (ABS) or Electronic Stability Program (ESP).

The LCU 222 may read out operational status information such as whether the motor is on or not, etc. and may provide this operational status information 228 to the LCU 202 at the other end of local communication connection 120. The LCU 202 may control storage of this operational status information in or in association with the user profile 209. In case the user profile 209 is not adapted for storing one or more of these operational status information items, the component 208 may discard the respective information.

Referring again to FIG. 3, in step 304, the setting information 124 is transmitted to the application server 108 via radio interface 124 and mobile network 110 (cf. FIG. 1), using transmission component 210 and MCU 212. In more detail, in parallel to initiating storage of the setting information 124 in user profile 209, the setting determination component 204 may trigger automatically the transmission component 210, which may be adapted to access user profile 209, extract the setting information 124 therefrom, and transmit the information towards the application server 108. The transmission component 210 may additionally or alternatively provide on a periodical basis setting information from the user profile to the application server in case the user is registered for a service. As a further possibility, the application server may also request setting information from terminal 106. As still another example, components 204, 208 and 210 may interwork to only indicate changes in the setting information stored in the user profile 209 to the application server.

An address of the application server may also be stored in user profile 209. For example, such an address may be provided to the terminal 106 on registration of the terminal for the service(s) provided by server 108.

While not illustrated in the figures, a localization application in the network may request location information, after the setting information 124 has been provided, from the mobile terminal 106. In response to such a request, the terminal 106 may provide location information based upon either the GPS unit 214 or the GPS unit 226 of vehicle 101. In the latter case, a location information derived from operation of unit 226 may be provided via Bluetooth communication 120 to the user terminal 106.

Figure 2B:
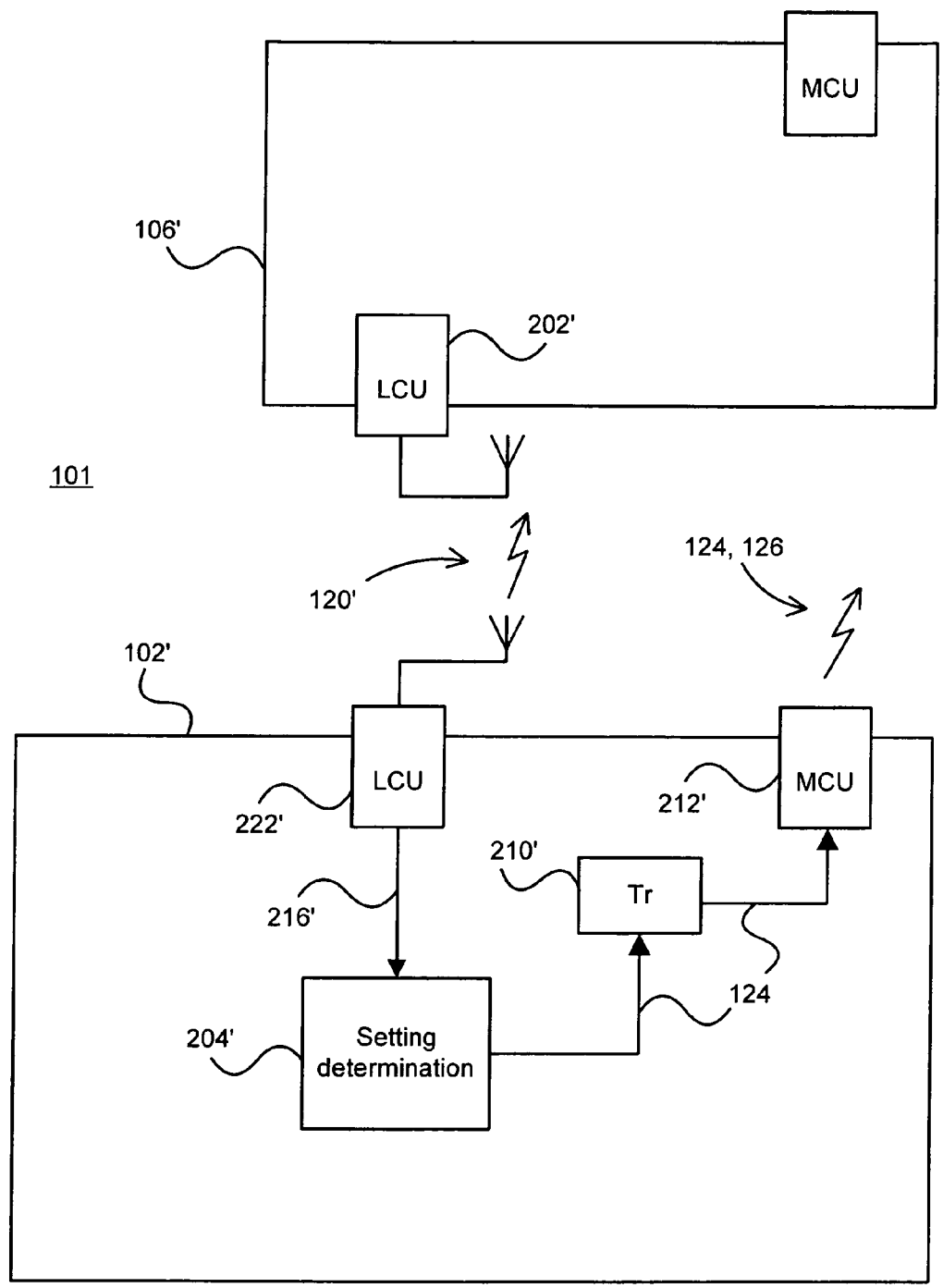
FIG. 2B schematically illustrates functional components of a second embodiment of the user terminal and vehicle of FIG. 1.

FIG. 2B illustrates functional components of a second embodiment of the user terminal 106 and terminal device 102 in vehicle 101 of FIG. 1, which are referenced for clarity in FIG. 2B with numerals 106' and 102', respectively. Again, as for the first embodiment of FIG. 2A, it is assumed that the user terminal 106' may be situated inside a passenger room of vehicle 101 while terminal device 102' is assumed to be fixedly built-in into the vehicle 101 in FIG. 2B. Generally, in FIG. 2B an element with the same or similar functionality or meaning as an element in FIG. 2A is denoted with the same reference numeral plus a n apostrophe. The mobile terminal 106' comprises a local communication unit (LCU) 202'. The vehicle 102' comprises an LCU 222' as well as a setting determination component 204', a transmission component 210' and a mobile communication unit (MCU) 212'.

In FIG. 2B the setting information 124 is established and transmitted over the radio interface 126 by the terminal device 102'. This alternative approach is chosen to illustrate an alternative procedure for the provision of the setting information 124. It is evident that for the procedure according to FIG. 2B, a transfer of the setting information 124 from a user profile associated with the terminal device 102' could be performed in a similar way as has been described with reference to user profile 208 in user terminal 106 in FIG. 2A. Similarly, a mapping entity corresponding to mapping storage 206 in FIG. 2A may also be available in the terminal device 102'.

The steps 302 and 304 of FIG. 3 may thus not only be performed by the user terminal itself, i.e. user terminal 106 in FIG. 2A, but may alternatively be performed by a terminal device associated with an environment such as device 102' in FIG. 2B, which is associated with vehicle 101.

Specifically (step 302), when a user of the user terminal 106' enters the vehicle 101, the LCUs 202' and 222' may either automatically (preferred) or upon a command manually entered on terminal 106' establish a communication 120'. For example, the communication 120' may be based upon a short-range communication technique such as Bluetooth. As a specific example, the terminal device 102' may support the Bluetooth SIM-Access-Profile (SAP). In this case, the user terminal 106' (in case it also supports SAP) may provide its IMSI to the terminal device 102' during establishment of the communication 120'. Then, the terminal device subscribes to and communicates with the mobile network 110 (cf. FIG. 1) using this IMSI. The user terminal 106' may be set to a stand-by mode.

Upon establishment of communication 120', the LCU 202 provides (arrow 216') a trigger signal to the setting determination component 204', the trigger signal indicating the communication link 120'. The setting determination component 204' in terminal device 102' determines from the establishment of the communication 120' information about a positional relation between the user terminal 106' and the vehicle 101. Hence, the setting determination component 204' is adapted to determine that the user terminal 106' is present in the vehicle 101, and may establish the setting information 124 "in the vehicle" accordingly. A simple prescription may be used according to which the establishment of a local communication to a user terminal such as communication 120' results in the setting information "in a vehicle". A termination of the local communication 120' may result in the setting information "not in a vehicle". The setting information may additionally comprise operational status information of the vehicle 101 (not shown in FIG. 2B) similarly as has been described with reference to FIG. 2A.

The setting information 124 established by the setting determination component 204' is provided to the transmission component 210'. Differently from the mechanism illustrated in FIG. 2A, in the embodiment of FIG. 2B the setting information 124 is directly provided to the transmission component 210' without storing it in a user profile. The provision of the setting information "in a vehicle" 124 may trigger the transmission component 210' to control the MCU 212' in order to transmit (step 304) the setting information 124 via radio interface 126 to mobile network 110 (cf. FIG. 1).

As has been shown with FIGS. 2A and 2B, the procedure 300 of FIG. 3 may be performed either in the user terminal 106 itself or in a terminal device 102' fixedly associated with the vehicle 101. In other embodiments, the distribution of tasks between the two terminal devices may be organized in still other ways. For example, the setting information may be established in the user terminal while it is transmitted from a terminal device in the vehicle. In this case, the user terminal provides the setting information to the terminal device in the vehicle for transmission. As another alternative, the user terminal may indicate a pre-defined setting information stored by the terminal device in the vehicle, e.g. within a user profile. As a variant, the user terminal may simply indicate one of one or more user profiles and the terminal device in the vehicle will transmit, in response to receiving the indication, automatically the setting information "in a vehicle" for the user terminal related to the indicated user profile.

Accordingly, the terminal device 102 and 102', respectively, associated with vehicle 101 may comprise a local communication unit such as 222 and 222', respectively, and may (102') or may not (102) comprise a mobile communication unit such as MCU 212'.

Figure 4:
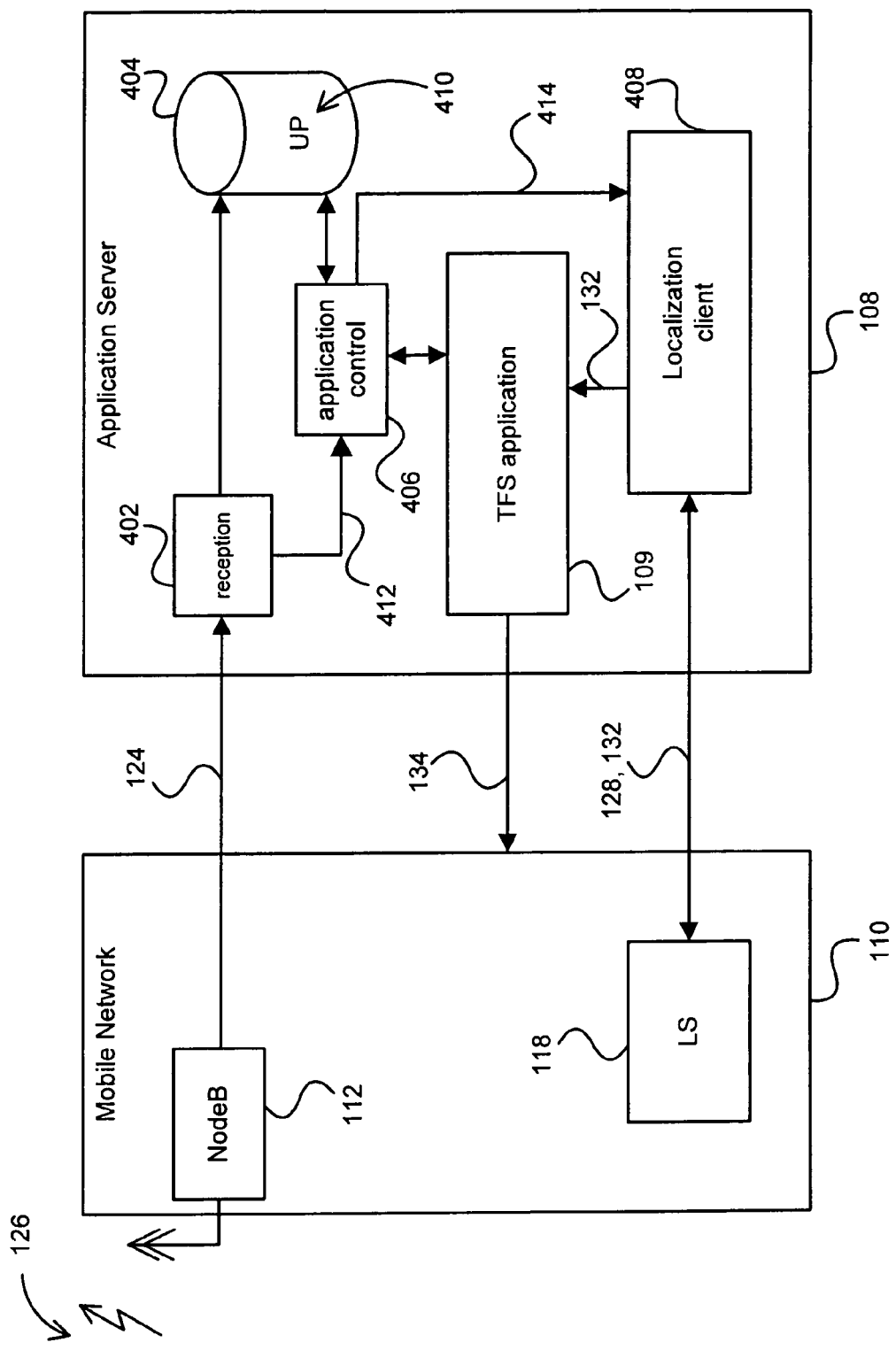
FIG. 4 schematically illustrates functional components of the mobile network and the application server in the communication system of FIG. 1.

FIG. 4 illustrates functional components of UMTS network 110 and application server 108 of FIG. 1. It is to be noted that, while the functional entity hosting the traffic forecast service application 109 is referred to as the application server 108, this server may comprise an application environment for automotive applications comprising multiple application servers and further entities such as gateway, firewall, authorization server etc. In other words, it is to be understood that the application server 108 may be a fully developed site of an application provider instead of only a single server. The functionality described in the following may therefore be implemented on a single server, or may be implemented in a distributed way on several nodes of an application server farm. The application provider of the application environment may or may not be identical to the operator of the mobile network 110.

The application server may be a part of the mobile network or may be located externally of mobile network. To explicitly illustrate both configurations, FIG. 1 shows the AS 108 inside the mobile network 110, while AS 108 is drawn outside of network 110 in FIG. 4.

The UMTS network 110 comprises NodeB 112 and localization server 118 already illustrated in FIG. 1. The application server 108 comprises a reception component 402, a profile storage 404, an application control component 406, the traffic forecast application 109 from FIG. 1 and a localization client 408.

Figure 5:
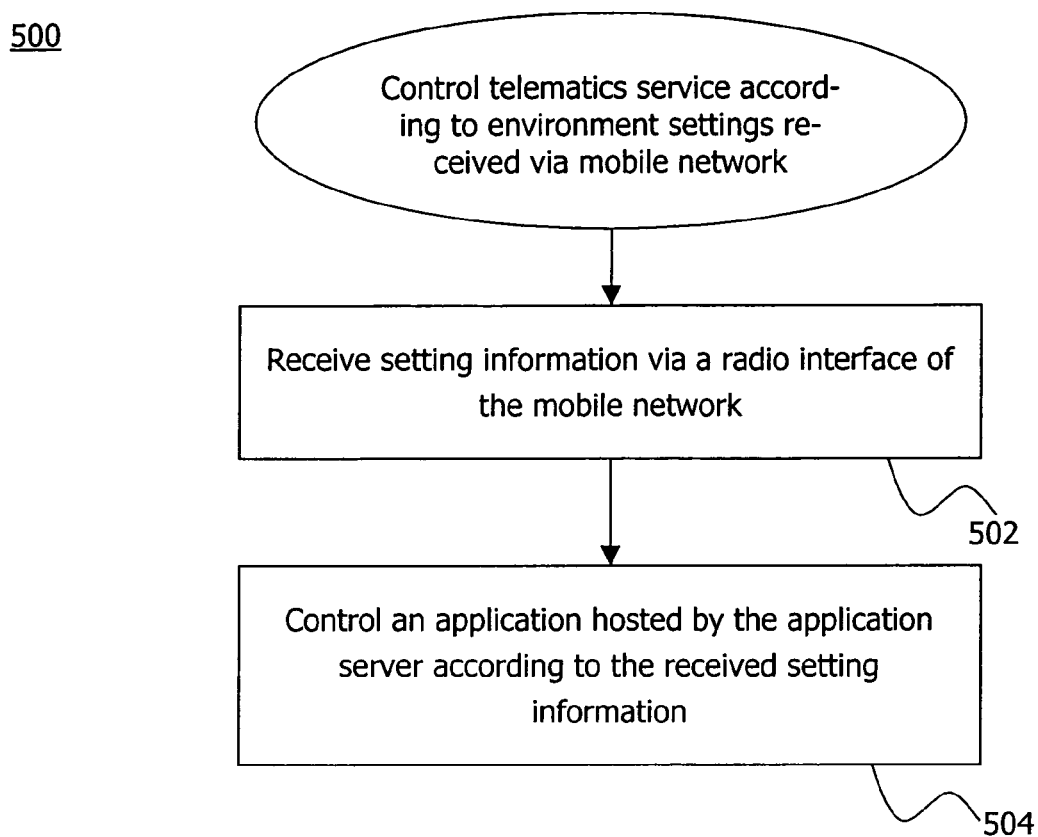
FIG. 5 is a flow diagram exemplarily illustrating an operation of the application server of FIG. 4.

FIG. 5 is a flow diagram illustrating an exemplary sequence 500 of operational steps which may be performed by the application server 108 within the framework of providing the TFS implemented by application 109. Basically, the application server operates to control the telematics application 109 according to the setting information 124 received via the mobile network 110 from the user terminal 106 (cf. FIG. 1).

In step 502, the reception component 402 receives the setting information 124 and provides the received setting information 124 to profile storage 404 for storage in association with a user profile 410 related to a user of the user terminal 106 (while it is referred only to user terminal 106 as illustrated in FIGS. 1 and 2A for brevity in the following description, it is intended that any such reference is understood as likewise referring to user terminal 106' as illustrated in FIG. 2B). The user profile 410 may comprise further data related to the user of terminal 106 and may or may not be similar in structure to the user profile 209 discussed with reference to FIG. 2A. For example, the user profile 410 may be specifically targeted with respect to services such as TFS service implemented by application 109 which are provided by the application server 108. In other words, the user profile 410 may define properties from an application point of view of the application provider. The profile storage 404 may store a plurality of user profiles of users of the services provided by the application server 108. In other embodiments, the setting information may be provided directly to one or more applications, without storing it in a user profile.

In step 504, the control component 406 operates to control application 109 according to the setting information 124 stored in user profile 410. While the component 406 is shown as an extra component in FIG. 4, it may as well be a part of the TFS application 109. In the implementation illustrated in FIG. 4, the reception component 402 provides, after having stored the setting information 124 in the storage component 404, a trigger signal 412 to the control component 406. Upon reception of trigger signal 412, the control component 406 considers the setting information 124 for execution of TFS application 109.

In more detail, the trigger signal 412 may initiate access of control component 406 to user profile 410 in storage 404 in order to firstly determine whether the user of terminal 106 is registered for the service provided by the TFS application 109. If this is the case, the setting information 124 itself is analyzed. As the information indicates that user terminal 106 is "in a vehicle", the control component concludes (explicitly or only implicitly) that user terminal 106 will now contribute to the traffic forecasts as calculated by the TFS application 109. Additionally or alternatively to accessing the user profiles in profile storage 404 upon reception of the trigger signal 412, the control component 406 may access profile storage 404 on a periodical basis in order to determine those users which are registered for the TFS application 109 and which have an associated user terminal momentarily being located "in a vehicle". For example, even without the trigger signal 412, the control component 406 will recognize automatically during its next poll that terminal 106 from now on has to be considered, after the reception component 402 has stored the setting information "in a vehicle" for user terminal 106 in user profile 410. In other embodiments, the setting information may additionally or alternatively also be provided directly to an application that is intended to use this information.

Upon determining that the user terminal 106 has to be considered, the control component 406 triggers the localization client 408, which then operates to provide the signal 128 already discussed with reference to FIG. 1 towards the localization server 118 of mobile network 110. The location information 132 received from server 118 is then provided by localization client 408 to the traffic forecast application 109. Accordingly, the location of terminal 106 is considered during determination of traffic forecasts. In other embodiments, the localization client 408 may additionally or alternatively provide the location information 132 to user profile 410. Eventually, the resulting traffic forecast is provided via communication 134 to mobile network 110 for distribution to the users thereof.

As discussed already, the setting information 124 may comprise, besides the indication "in a vehicle", further information, e.g. operational status information of vehicle 101. The control component 406 may use this information when determining whether the location of user terminal 106 (or terminal device 102) is actually to be used for the TFS application 109. For example, indications such as "motor is started" and/or "vehicle is moving" may be used to decide whether the vehicle is standing on a parking place or is actually a part of the traffic flow to be analyzed. Decision algorithms may have to consider, for example, that in case of a traffic jam the vehicle is not moving and the driver may also have stopped the motor. Prior information (history setting information) and/or the setting information (including possibly operational status information) of further registered participants located nearby may be used to more reliably determine whether a particular user is actually to be considered or not and to in this way further increase the reliability of the resulting traffic forecast.

While it has been illustrated in FIG. 4 that the setting information 124 is stored in profile storage 404 in the application server 108, additionally or alternatively the setting information may also be stored in a user profile storage in the mobile network 110, such as the HSS 116 (cf. FIG. 1).

As described hereinbefore, an application hosted by an application server or in an application environment may be controlled to consider a location of the user terminal dependent on the environment setting of the terminal. Additionally or alternatively, also the provision of the application to the user terminal may be controlled accordingly. For example, an automotive service may only be provided to terminals for which the environment setting indicates that the terminals are located in a vehicle.

Figure 6:
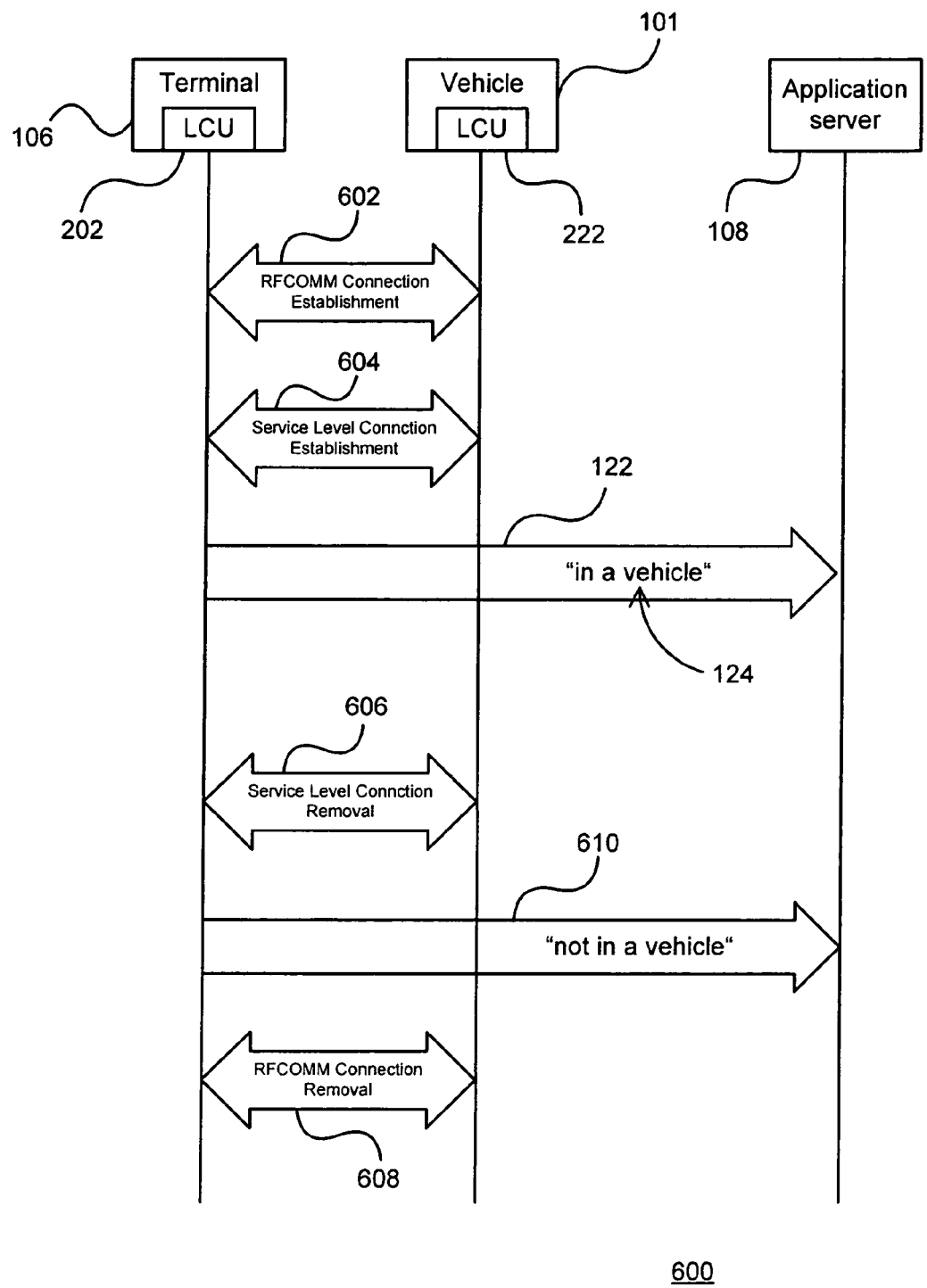
FIG. 6 is a sequence diagram exemplarily illustrating a message flow in the communication system of FIG. 1.

FIG. 6 is a sequence diagram illustrating an exemplary sequence of messages exchanged between the user terminal 106, vehicle 101 and application server 108. Message exchange 602 and 604 illustrate the setup of the Bluetooth connection 120 between the LCUs 202 and 222 illustrated in FIG. 2A. Each of the messages exchanges illustrated may comprise one or more message pairs exchanged between the communication partners.

It has been described with reference to FIG. 2A that terminal 106 may use an internal mapping table 207 in order to decide that setting information 124 "in a vehicle" has to be sent. In an alternative implementation, the vehicle may provide an explicit indication to the terminal that it is communicating with a vehicle. Moreover, the vehicle may send an explicit indication that the setting information "vehiclein a vehicle" shall be sent to an application server. In case of the message sequence 600, such indications may be provided to the terminal 106, e.g., during the service level connection establishment procedure 604. In other implementations, in addition to the Bluetooth protocol used for message exchanges 602 and 604, a further protocol may be used for providing indications related to an environment setting and/or operational status information from the vehicle to the terminal device. Such a protocol may be defined on top of one or more of local communication protocols such as Bluetooth, WLAN etc.

A transmission of the setting information 124 to an application server which is explicitly requested by the vehicle is a further possibility to achieve that the setting information is automatically sent to the application server upon establishment of the setting information in the user terminal 106. An address of an appropriate application server to provide the setting information thereto may or may not be provided by the vehicle. At least in the latter case, such address may be configured in user terminal 106, as described above with reference to FIG. 2A. Various mechanisms may be used for the transmission 122 of the setting information 124 to the application server via mobile network 110 (not shown in FIG. 6). For example, an SMS may be sent, or SIP signalling, user-to-user signalling, ISDN signalling, etc. may be used. With regard to SIP, e.g., the SIP presence mechanism may be used. Also any proprietary protocol may be used, e.g. an IP-based protocol provided by the mobile network operator.

In response to reception of the setting information 124 in transmission 122, the application server 108 may activate or modify one or more of the vehicle telematics services hosted by server 108. For example, a traffic forecast application may start to consider the user terminal for its service. As illustrated in FIG. 4, the application server may initiate a localization procedure in order to determine the location of the terminal 106. The resulting message exchange for localization is not indicated in FIG. 6. The location of the user terminal is then considered by the application for determining traffic forecasts. As the application may only consider user terminals which are—according to their corresponding setting information—"in a vehicle", the traffic forecast will be more precise as compared to a case in which all registered user terminals are considered independent of their actual environment settings.

With message exchanges 606 and 608 the Bluetooth communication link between user terminal 106 and vehicle 101 will be terminated, for example because the user removes terminal 106 from the vehicle 101. During termination, e.g. after the service level connection has been removed, the terminal 106 may automatically or triggered by the vehicle 101 perform a transmission 610 including setting information "not in a vehicle" to the application server 108. The application server may then deactivate consideration of the (location of) the terminal 106 for one or more of its hosted services. For example, it may stop requesting the location of the mobile phone.

While it has been described hereinbefore that the setting information indicates the relation of a user terminal to a physical object such as a vehicle, in general the setting information may include any information which may be, in the widest sense, related to the environment of the terminal and relevant for a particular service. For example, the setting information may also or additionally indicate environmental parameters such as local temperature, local time, etc. The operational status information of a vehicle, which may be included in setting information, may also include the vehicle brand and model, or the particular type of vehicle, e.g. passenger car, taxi, bus, van, etc.

Applications implementing vehicle telematics services have been exemplarily used to illustrate the techniques proposed herein. Emergency applications are another class of applications, for which these techniques are relevant. Consider, for example, a user terminal performing an emergency call. In this case, a location of the terminal may be sent to an emergency centre. Environment setting information, such as "in a vehicle" may additionally and automatically be provided to the emergency centre. The setting information may then be used to trigger actions to be taken either manually by an operator in the centre or automatically. For example, a decision whether to send a helicopter, a car or a policeman may be based upon such setting information.

The provision of the setting information to an application server may also be triggered by the user, i.e. manually, e.g. by selecting a particular profile, such as "vehicle", "meeting", etc. on the user terminal. In this case, no connection between user terminal and, e.g., a vehicle is required. However, this may also exclude that the setting information comprises operational status information of the vehicle.

In case a GPS unit is available either in the user terminal or the vehicle, a localization based on a localization service in the mobile network and a localization based on the GPS unit may both be used as complementary mechanisms. For example, the localization service may be used as backup mechanism in case the GPS unit currently has no satellite connection available. In other embodiments, the localization service may be used in order to limit a transmission resource usage over the radio interface of the mobile network.

The techniques proposed herein may be used for services other than vehicle telematics services. Consider for example the environment settings "not/in a meeting (room)". In case the setting information indicates "in a meeting room", telecommunication supplementary services such as Call Forwarding Unconditional (to a Mailbox, to a colleague, to a secretary) may automatically be activated. Environment settings such as "not/at work" may be used to control services such as Call Forwarding or Call Barring in a user profile such that an incoming call, e.g. a private call, is barred or forwarded only after a predetermined time.

The techniques proposed herein allow the provision of more reliable application services, e.g. in a telematics environment. For example, the invention allows tracking user terminals (mobile phones) for the analysis of a traffic flow in a more reliable way by only considering such terminals actually being part of the traffic flow. Setting information may be used to indicate a general environment setting or type of environment at which, near which or within which a user terminal is situated. The setting information may be used alone or in addition to location information indicating a geographical position of the user terminal. While location information may be used in an application as input data to performing calculations etc., the setting information may be control data for controlling such a localization application (or any other application). For example, the application may be controlled to start recognizing the location of the mobile phone for traffic forecast/alert only after the terminal has signalled that it is in a vehicle.

The availability of such setting information enhances the usability of services. For example, a traffic flow related service will be able to offer more reliable predictions of traffic flows. Actions to be taken in response to an emergency call may be more specifically adapted to the environment, at which the emergency case occurs. The setting information may be used to automatically configure supplementary telecommunication services such as Call Forwarding Unconditional.

A user profile, such as related to a mobile/fixed network, may be automatically configured according to an environment of the user terminal such as "meeting", "home", "work". In case the user terminal is adapted to detect, e.g. via a local communication connection, an environment setting and provide the setting information automatically, the above advantages may be available to users without any additional manual configuration work. In other cases, the user may have to choose an environment such as "not/in a vehicle" manually. A manual configuration (change) may trigger a propagation of setting information to an application server and/or a user profile in a mobile network (e.g., in the HSS) or other servicing infrastructure.

In order to implement the proposed techniques, minor modifications only are required in, e.g., user terminals or mobile network components. For example, in case predefined setting information are provided to both the user terminal and the application server, even a single bit may has to be additionally transmitted via the radio interface in order to control an application.

Many location-based services such as traffic forecast services may take advantage of the proposed techniques using the existing triangulation-based localization services in mobile networks with their limited accuracy, i.e. the localization of vehicles needs not to be determined with an accuracy in the centimetre range to increase accuracy of traffic forecasts.

While the current invention has been described in relation to its preferred embodiments, it is to be understood that this description is for illustrative purposes only.

Accordingly, it is intended that the invention be limited only by the scope of the claims appended hereto.

The invention claimed is:

1. A method of controlling an application server comprising the following steps performed by an application server accessible via a mobile network:
  receiving setting information via a radio interface of the mobile network, wherein the setting information indicates an environment setting of an environment in which a user terminal is deployed and comprises one or more bits identifying a position of the user terminal relative to the environment, wherein the environment is a physical object; and
  controlling an application hosted by the application server according to the received setting information.

2. The method according to claim 1, wherein the setting information comprises an indication of an operational status of the physical object.

3. The method according to claim 2, wherein the physical object is a vehicle.

4. The method according to claim 1, further comprising initiating, triggered by the reception of the setting information, an execution of a localization service to determine a location related to the user terminal, or to a terminal device associated with the environment in which the user terminal is deployed, or both.

5. The method according to claim 1, wherein the application implements a vehicle telematics service.

6. The method according to claim 1, wherein the setting information is included in a user profile related to the user terminal.

7. The method according to claim 1, wherein the setting information indicates one of a plurality of predefined environment settings.

8. A method of controlling an application server accessible via a mobile network comprising the following steps performed by a terminal device of the mobile network:
   establishing setting information indicating an environment setting of an environment in which a user terminal is deployed, the setting information including one or more bits that identify a position of the user terminal relative to the environment, wherein the environment is a physical object; and
   transmitting the setting information via a radio interface of the mobile network to the application server, for controlling an application according to the setting information.

9. The method according to claim 8, wherein the terminal device comprises the user terminal or a terminal device associated with the environment in which the user terminal is deployed.

10. The method according to claim 8, wherein the step of transmitting the setting information is automatically triggered by the step of establishing the setting information.

11. The method according to claim 8, wherein establishing the setting information comprises:
    receiving an indication for the environment setting via a local communication connection between the user terminal and the terminal device associated with the environment in which the user terminal is deployed; and
    determining the setting information from the indication.

12. The method according to claim 11, wherein the indication is received during establishment of the local communication connection.

13. The method according to claim 11, wherein the local communication connection comprises a wireless local communication connection.

14. An application server accessible via a mobile network, comprising:
    a first component configured to receive setting information via a radio interface of the mobile network, wherein the setting information indicates an environment setting of an environment in which a user terminal is deployed and includes one or more bits that identify a position of the user terminal relative to the environment, wherein the environment is a physical object; and
    a second component configured to control an application hosted by the application server according to the setting information.

15. The application server according to claim 14, wherein the setting information comprises an indication of an operational status of the physical object.

16. The application server according to claim 15, wherein the physical object is a vehicle.

17. The application server according to claim 14, wherein the second component, triggered by the reception of the setting information, is configured to execute a localization service to determine a location related to the user terminal, or to a terminal device associated with the environment in which the user terminal is deployed, or both.

18. The application server according to claim 14, wherein the application implements a vehicle telematics service.

19. The application server according to claim 14, wherein the setting information is included in a user profile related to the user terminal.

20. The application server according to claim 14, wherein the setting information indicates one of a plurality of predefined environment settings.

21. A terminal device of a mobile network, comprising:
    a first component configured to establish setting information indicating an environment setting of an environment in which a user terminal is deployed, the setting information including one or more bits that identify a position of the user terminal relative to the environment, wherein the environment is a physical object; and
    a second component configured to transmit the setting information via a radio interface of the mobile network to an application server for controlling an application according to the setting information.

22. The terminal device according to claim 21, wherein the terminal device comprises the user terminal or a terminal device associated with the environment in which the user terminal is deployed.

23. The terminal device according to claim 21, wherein the second component, triggered by the first component establishing the setting information, is configured to transmit the setting information automatically.

24. The terminal device according to claim 21, wherein to establish the setting information, the first component is configured to:
    receive an indication for the environment setting via a local communication connection between the user terminal and the terminal device associated with the environment in which the user terminal is deployed; and
    determine the setting information from the indication.

25. The terminal device according to claim 24, wherein the first component is configured to receive the indication during establishment of the local communication connection.

26. The terminal device according to claim 24, wherein the local communication connection comprises a wireless local communication connection.

\* \* \* \* \*